US012683463B2

(12) United States Patent
Andreasen et al.

(10) Patent No.: US 12,683,463 B2
(45) Date of Patent: Jul. 14, 2026

(54) WIND TURBINE GENERATOR ROTOR ARRANGEMENT

(71) Applicant: Vestas Wind Systems A/S, Aarhus N (DK)

(72) Inventors: Marcin Blazniak Andreasen, Hovedgärd (DK); Rajarao Punnamaraju Lova, Karnataka (IN); Lars Langvardt Krogh, Egå (DK); Anoop Jassal, Højbjerg (DK)

(73) Assignee: Vestas Wind Systems A/S, Aarhus N. (DK)

( * ) Notice: Subject to any disclaimer, the term of this patent is extended or adjusted under 35 U.S.C. 154(b) by 240 days.

(21) Appl. No.: 18/267,635

(22) PCT Filed: Nov. 8, 2021

(86) PCT No.: PCT/DK2021/050328
§ 371 (c)(1),
(2) Date: Jun. 15, 2023

(87) PCT Pub. No.: WO2022/135639
PCT Pub. Date: Jun. 30, 2022

(65) Prior Publication Data
US 2024/0055949 A1     Feb. 15, 2024

(30) Foreign Application Priority Data

Dec. 23, 2020    (IN) .............................. 202011056009
Feb. 8, 2021    (DK) ................................. 2021 70057

(51) Int. Cl.
H02K 9/06         (2006.01)
F03D 1/06         (2006.01)
(Continued)

(52) U.S. Cl.
CPC ............. H02K 9/06 (2013.01); F03D 1/0602 (2023.08); H02K 1/276 (2013.01); H02K 7/1838 (2013.01)

(58) Field of Classification Search
CPC .... F03D 1/0602; H02K 1/276; H02K 1/2766; H02K 1/32; H02K 7/1838; H02K 9/06; H02K 9/10
(Continued)

(56) References Cited

U.S. PATENT DOCUMENTS

| | | | |
|---|---|---|---|
| 7,168,923 B2 * | 1/2007 | Vasilescu | .............. F04D 29/282 416/185 |
| 7,385,322 B2 * | 6/2008 | Park | ......................... H02K 9/06 310/63 |

(Continued)

FOREIGN PATENT DOCUMENTS

| | | |
|---|---|---|
| CN | 206149056 U | 5/2017 |
| CN | 108331714 A | 7/2018 |

(Continued)

OTHER PUBLICATIONS

International Searching Authority, International Search Report and Written Opinion issued in corresponding PCT Application No. PCT/DK2021/050325, dated Mar. 9, 2022.
(Continued)

*Primary Examiner* — Alex W Mok
(74) *Attorney, Agent, or Firm* — Wood Herron & Evans LLP

(57)    ABSTRACT
Aspects of the present invention relate to a rotor arrangement (42) for a wind turbine generator (24). The rotor arrangement (42) comprises a cylindrical ring structure (46) arranged to rotate around a rotational axis. The cylindrical ring structure (46) comprises: a plurality of ring-shaped permanent magnet packages (48) arranged coaxially around
(Continued)

the rotational axis, a plurality of tie rods (55) extending axially through the plurality of permanent magnet packages (48) to join the plurality of permanent magnet packages (48) together; and one or more spacer components (64; 164) located between at least one axially adjacent pair of the plurality of permanent magnet packages (48) to space the respective pair of permanent magnet packages (48) apart, wherein the one or more spacer components (64; 164) are configured to act as an impeller as the rotor rotates, in use, thereby to cause air to flow in a radial direction, with respect to the rotational axis of the rotor arrangement (42), between the at least one axially adjacent pair of permanent magnet packages (48). The generator rotor arrangement uses a portion of the kinetic energy of the rotating rotor arrangement to generate a radial air flow that flows between and/or around the magnet packages to transfer heat away from the magnet packages, and thereby to provide a cooling function.

31 Claims, 10 Drawing Sheets

(51) Int. Cl.
    *H02K 1/276*        (2022.01)
    *H02K 7/18*         (2006.01)
(58) Field of Classification Search
    USPC .......................................................... 310/61
    See application file for complete search history.

(56)                References Cited

U.S. PATENT DOCUMENTS

| | | | | |
|---|---|---|---|---|
| 7,802,454 | B2 * | 9/2010 | Cho ........................ | D06F 37/40 |
| | | | | 68/12.24 |
| 8,157,524 | B2 * | 4/2012 | Nicgorski ............. | F04D 29/329 |
| | | | | 416/169 A |
| 8,651,814 | B2 * | 2/2014 | Nicgorski ............. | F04D 29/663 |
| | | | | 416/93 R |
| 9,537,373 | B2 * | 1/2017 | Bledsoe ................... | H02K 9/06 |
| 10,186,936 | B2 * | 1/2019 | Fröhlich ................ | H02K 11/33 |
| 2013/0062975 | A1 | 3/2013 | Pabst et al. | |
| 2013/0293043 | A1 | 11/2013 | Gardas et al. | |
| 2020/0373807 | A1 * | 11/2020 | Hwang .................. | H02K 5/207 |

FOREIGN PATENT DOCUMENTS

| | | | |
|---|---|---|---|
| EP | 2400634 | A1 | 12/2011 |
| JP | S5553143 | A | 4/1980 |
| WO | 2014016805 | A2 | 1/2014 |
| WO | 2020143888 | A1 | 7/2020 |

OTHER PUBLICATIONS

Danish Patent and Trademark Office, examination report issued in corresponding Danish Patent Application No. PA 2021 70057, Jul. 23, 2021.

* cited by examiner

WIND TURBINE GENERATOR ROTOR ARRANGEMENT

TECHNICAL FIELD

The invention relates to a rotor arrangement for an electrical generator particularly, though not exclusively, that can be used in a wind turbine.

BACKGROUND

Wind turbines convert kinetic energy from the wind into electrical energy, using a large rotor with a number of rotor blades. A typical Horizontal Axis Wind Turbine (HAWT) comprises a tower, a nacelle on top of the tower, a rotor hub mounted to the nacelle and a plurality of wind turbine rotor blades coupled to the rotor hub. Depending on the direction of the wind, the nacelle and rotor blades are turned and directed into an optimal direction by a yaw system for rotating the nacelle and a pitch system for rotating the blades.

The nacelle houses many functional components of the wind turbine, including for example a generator, gearbox, drive train and rotor brake assembly, as well as convertor equipment for converting the mechanical energy at the rotor into electrical energy for provision to the grid. The gearbox steps up the rotational speed of the low speed main shaft and drives a gearbox output shaft. The gearbox output shaft in turn drives the generator, which converts the rotation of the gearbox output shaft into electricity. The electricity generated by the generator may then be converted as required before being supplied to an appropriate consumer, for example an electrical grid distribution system. So-called "direct drive" wind turbines that do not use gearboxes are also known. In a direct drive wind turbine, the generator is directly driven by a shaft connected to the rotor.

As is known, one type of generator used in a wind turbine is known as an 'IPM' (interior permanent magnet) electric machine comprising an external stator assembly which surrounds an internal rotor arrangement. The IPM internal rotor arrangement is typically composed of multiple annular permanent magnetic packages, supported on a central shaft. The gearbox output shaft interfaces with the central shaft of the rotor arrangement.

In use, the large electrical currents that circulate through the stator generate a great deal of thermal energy, which needs to be dissipated effectively to maintain optimum performance of the generator. Air-cooling is a cost-effective method of providing cooling of the generator, but it can be challenging to arrange the generator components in such a way to provide an adequate flow of cooling air through the generator in mega-watt scale systems. It is against this background that the examples of the invention have been devised.

SUMMARY OF THE INVENTION

According to a first aspect of the invention, there is provided a rotor arrangement for a wind turbine generator. The rotor arrangement comprises a cylindrical ring structure arranged to rotate around a rotational axis. The cylindrical ring structure comprises: a plurality of ring-shaped permanent magnet packages arranged coaxially around the rotational axis, a plurality of tie rods extending axially through the plurality of permanent magnet packages to join the plurality of permanent magnet packages together; and one or more spacer components located between at least one axially adjacent pair of the plurality of permanent magnet packages to space the respective pair of permanent magnet packages apart, wherein the one or more spacer components are configured to act as an impeller as the rotor rotates, in use, thereby to cause air to flow in a radial direction, with respect to the rotational axis of the rotor arrangement, between the at least one axially adjacent pair of permanent magnet packages.

In this manner, the generator rotor arrangement is configured to use a portion of the kinetic energy of the rotating rotor arrangement to generate a radial air flow. The radial airflow flows between and/or around the magnet packages to transfer heat away from the magnet packages, and thereby to provide a cooling function. The radial airflow may also flow towards a stator of the wind turbine generator, for example passing through radial channels of a surrounding stator to transfer heat away therefrom and effectively cooling the stator. This form of self-pumping provides enhanced cooling of the rotor, and the stator, for greater temperature control and hot-spot reduction.

By 'cause' it is intended to mean that the spacer means is configured to drive, pressurise or otherwise impel, the air so as to generate, accelerate, or generally increase an air flow in the radial direction with respect to the rotational axis of the rotor arrangement.

In an example, the rotor arrangement further comprises one or more spacer components located adjacent to an axially outer end package of the plurality of ring-shaped permanent magnet packages, against which one or more retaining elements of the rotor arrangement bear to retain the permanent magnet packages on the plurality of tie rods. For example, the one or more retaining elements may include an end ring, a ring-shaped flange, or mechanical fasteners. The one or more spacer components at the end packages may, for example, be configured to act as an impeller as the rotor rotates, in use, thereby to cause air to flow in a radial direction so that the radial flow of air flows across the adjacent end package Optionally, each spacer component may be arranged for retaining one or more permanent magnets of the adjacent permanent magnet package in one or more respective axial cavities of that permanent magnet package. In this manner, the spacer components may overlap the axial cavities of the permanent magnet packages to provide retaining walls for substantially inhibiting axial movement of the permanent magnets within the permanent magnet packages (preventing the permanent magnets from falling out of said axial cavities).

In an example, the one or more spacer components may comprise a plurality of circumferentially arranged spacer components, each of the plurality of spacer components being arranged on a respective one of the plurality of tie rods.

Each tie rod may, for example, extend through a respective hole in each permanent magnet packages arranged between a respective pair of permanent magnets of said permanent magnet package.

Each of the plurality of circumferentially arranged spacer components may be shaped to define an impeller element for causing the radial flow of air. The impeller element may be in the form of a vane, blade, or other suitable aerodynamic structure.

In an example, the one or more spacer components may include a circumferentially extending spacer plate comprising a plurality of radially extending channels recessed from a radial surface of the spacer plate, the plurality of channels being shaped to define a respective impeller element between each pair of adjacent channels for causing the radial flow of air and directing the radial airflow through the respective pair of adjacent channels. The spacer plate may extend circumferentially around the adjacent permanent magnet package, for example extending across a quarter, a half or substantially the entire circumference of the adjacent permanent magnet package. Each impeller elements may include a respective tie rod hole through which a respective may be received.

Optionally, each impeller element is elongate and extends from a leading edge to a radially outer trailing edge. For example, each impeller element may have a chord line or longitudinal axis extending between the leading edge and the trailing edge.

Optionally, each impeller element may be asymmetric.

Each impeller element may comprise: a first air guiding surface extending between the leading and trailing edges on a first side of the impeller element and a second air guiding surface extending between the leading and trailing edges on an opposing second side of the impeller element. For example, the first air guiding surface may be arranged on an oncoming side or pressure side of the impeller element, which faces the oncoming air as the rotor arrangement rotates (facing in the direction of rotation).

The first and second air guiding surfaces may each be curved, and/or arcuate. For example, the first air guiding surface may be, at least partially, concave and the second air guiding surface may be, at least partially, convex. For example, the first air guiding surface may be curved in a concave manner in a first portion that extends from the leading edge towards a point of maximum camber. Beyond the point of maximum camber, the first air guiding surface may be convexly curved towards the trailing edge. In combination, the curvature and inclination may provide a backwardly curved impeller element with respect to the direction of rotation.

Each impeller element may for example, expand width wise between the leading and trailing edges. For example, each impeller element may have a maximum width, extending orthogonally to the longitudinal axis between the first and second air guiding surfaces, that is at least 20% of the length of the impeller element along the longitudinal axis (between the leading and trailing edges). Each impeller element may, for example, have a maximum width that is less than 40%, or even less than 30%, of the length along the longitudinal axis of the impeller element. Optionally, the maximum width of each impeller element may be distal from the leading edge, for example spaced from the leading edge by more than 50% of the length of the impeller element, preferably spaced from the leading edge by more than 60% of the length of the impeller element.

A maximum orthogonal distance measured from the longitudinal axis to the first air guiding surface may, for example, differ from a maximum orthogonal distance measured from the longitudinal axis to the second air guiding surface. Optionally, the maximum orthogonal distance to the first air guiding surface may be at least 200%, or at least 300%, of the maximum orthogonal distance to the second air guiding surface. The first air guiding surface may have increased curvature relative to the second air guiding surface, for example to accelerate the radial air flow more on the oncoming side.

Each impeller element may, for example, be arranged to extend in a substantially radial direction of the rotor arrangement, between the leading edge and the trailing edge.

The longitudinal axis may be backwardly inclined relative to the direction of rotation of the rotor arrangement, in use, to cause air to flow in a radially outward direction. In other words, the longitudinal axis may be inclined relative to a radial axis of the rotor arrangement away from the direction of rotation of the rotor arrangement so that the trailing edge is circumferentially offset from the leading edge in a direction that opposes the direction of rotation. A backward inclination effectively generates an outward radial air flow.

The longitudinal axis of the impeller element may, for example, be inclined to the radial direction by more than 30 degrees, preferably more than 40 degrees. Additionally, or alternatively, the longitudinal axis of the impeller element may, for example, be inclined to the radial direction by less than 60 degrees, preferably less than 50 degrees. For example, the longitudinal axis of the impeller element may be inclined to the radial direction by 42 degrees.

In an example, the longitudinal axis may be forwardly inclined relative to the direction of rotation of the rotor arrangement, in use, to cause air to flow in a radially inward direction. For example, where the rotor arrangement rotates around an interior stator.

In an example, each impeller element may be shaped so that the leading edge protrudes radially inward, beyond an inner circumferential edge of the adjacent permanent magnet package, to meet oncoming air as the rotor arrangement rotates. In this manner, the impeller element may effectively draw air from a central hollow portion of the cylindrical ring structure. For example, the length along the longitudinal axis, or chord line, between the leading and trailing edges of each impeller element may be greater than the width of the adjacent ring-shaped permanent magnet package. The width of the adjacent permanent magnet package being the distance between an inner circumferential edge and an outer circumferential edge of that magnet package. In an example, the length of each impeller element may be at least 120% of the width of the adjacent ring-shaped permanent magnet package. Additionally, or alternatively, the length of each impeller element may be less than 180% of the width of the adjacent ring-shaped permanent magnet package. For example, the length of each impeller element may be approximately 160% of the adjacent ring-shaped permanent magnet package. The spacer components may be arranged so that the leading edge, and up to 20%, or even 25%, of the length of each spacer component, protrudes radially inward beyond an inner circumferential edge of the adjacent magnet packages. Optionally, the protruding portion of each spacer component may be thicker, in the axial direction, than the rest of the spacer component. For example, each spacer component may include an axial expansion, or lip, at the protruding portion, which may be configured to abut against the inner circumferential edge of at least one of the adjacent magnet packages to retain the spacer component in position.

The one or more spacer components may, for example, be joined by an adhesive to the adjacent permanent magnet package.

Optionally, each spacer component may include one or more axial locking formations for engaging one or more complementary formations on the adjacent permanent magnet package to retain the spacer component in position, adjacent to that permanent magnet package.

For example, at least one of said complementary formations on the adjacent permanent magnet package may be defined by one of the one or more axial cavities of that permanent magnet package. In an example, each spacer component may include a pair of such axial locking formations, each axial locking formation engaging a respective one of the axial cavities of the permanent magnet package to substantially inhibit rotation of the spacer component, relative to the adjacent permanent magnet package, as the rotor arrangement rotates.

In an example, the rotor arrangement may further comprise one or more impeller vanes extending radially inward from an inner circumferential edge of the cylindrical ring structure, for causing the radial flow of air as the rotor arrangement rotates. Each impeller vane may, for example, be arranged in a complementary manner to a respective impeller element of the one or more spacer components so that, collectively, the impeller vane and the impeller element cause the radial flow of air as the rotor arrangement rotates. For example, the impeller vanes may be aligned with the impeller elements of the spacer components so as to direct a suitable airflow onto air guiding surfaces of the impeller elements, for further acceleration radially between the magnet packages.

Optionally, each impeller vane may be connected to a respective impeller element of the one or more spacer components. For example, each impeller vane may be connected to the leading edge of the respective impeller element.

Each impeller vane may, for example, extend axially along the length of the cylindrical ring structure.

Optionally, the cylindrical ring structure may define a central hollow portion. For example, an end of the cylindrical ring structure may be attached to a drive shaft of the wind turbine, so that there is no central hub extending through the ring structure, and instead, a central hollow portion may be defined within the cylindrical ring structure. For example, the cylindrical ring structure may be attached to the drive shaft via a ring-shaped flange attached to an end of the cylindrical ring structure. The central hollow portion provides for reduced weight of the rotor arrangement and increased airflow therethrough.

Each impeller vane may, for example, define a leading edge within the central hollow portion of the cylindrical ring structure, the leading edge being configured to meet oncoming air as the rotor arrangement rotates, and thereby to cause a flow of air in a radial direction. In other words, the impeller vanes may extend partially into the central hollow portion so that the leading edges of the impeller vanes meet oncoming air within the central hollow portion, as the rotor arrangement rotates, and guide that air radially, for example towards the spacer means.

According to another aspect of the invention there is provided a rotor arrangement for a wind turbine generator. The rotor arrangement comprises: a cylindrical ring structure, defining a central hollow portion, arranged to rotate around a rotational axis, the cylindrical ring structure comprising: a plurality of ring-shaped permanent magnet packages arranged coaxially around the rotational axis, a plurality of tie rods extending axially through the plurality of permanent magnet packages to join the plurality of permanent magnet packages together; and between at least one axially adjacent pair of the plurality of permanent magnet packages, a plurality of circumferentially arranged spacer components, each of the plurality of spacer components being arranged on a respective one of the plurality of tie rods and being configured to hold that pair of permanent magnet packages apart to define a pair of radial channels that extend between the pair of permanent magnet packages, and a plurality of impeller vanes, each impeller vane extending radially inward from an inner circumferential edge of the cylindrical ring structure to define a leading edge within the central hollow portion of the cylindrical ring structure, the leading edge being configured to meet oncoming air as the rotor arrangement rotates, in use, and thereby to cause a flow of air in a radial direction through the respective pair of radial channels.

As in the previous aspect, the generator rotor arrangement is therefore configured to use a portion of the kinetic energy of the rotating rotor arrangement to generate a radial air flow. The radial airflow flows between and/or around the magnet packages to transfer heat away from the magnet packages, and thereby provides a cooling function. The radial airflow may also flow towards a stator of the generator to provide effective cooling of the stator. This form of self-pumping provides enhanced cooling of the rotor and stator for greater temperature control and hot-spot reduction. Furthermore, each impeller vane extends only partially into the central hollow portion to minimise the cost and weight of the rotor arrangement, whilst the leading edge of the impeller vanes can suitably meet the oncoming air, as the rotor arrangement rotates, and guide that air onto surfaces of the impeller vane that accelerate the air in a radial direction. For example, each impeller vane may extend less than extend a radial distance that is less than 30%, preferably less than about 20%, and more preferably less than 10%, across the radius of the central hollow portion.

Each impeller vane may, for example, extend axially along the length of the cylindrical ring structure.

Each impeller vane may, for example, be arranged in a complementary position to a respective spacer component so that, as the rotor arrangement rotates, the leading edge of each impeller vane meets oncoming air in the central hollow portion, and generates an airflow steered around the respective spacer component and through the respective radial channels extending between the adjacent magnet packages.

Optionally, each impeller vane may take the form of an elongate arcuate blade that extends from the leading edge, within the central hollow portion, to a radially outer trailing edge at the inner circumferential edge of the cylindrical ring structure.

Each impeller vane may be arranged so that a chord line or longitudinal axis of that impeller vane, which extends between the leading and trailing edges, may be aligned substantially tangentially with the respective spacer means so as to guide the airflow radially past the spacer means and through the respective radial channel.

Optionally, each impeller vane may be arranged so that the longitudinal axis is backwardly inclined with respect to the direction of rotation of the rotor arrangement so as to cause air to flow in a radially outward direction. The longitudinal axis of the impeller vane may, for example, be inclined to the radial direction by more than 30 degrees, preferably more than 40 degrees. Additionally, or alternatively, the longitudinal axis of the impeller vane may, for example, be inclined to the radial direction by less than 60 degrees, preferably less than 50 degrees. For example, the longitudinal axis of the impeller vane may be inclined to the radial direction by 42 degrees.

According to a further aspect of the invention there is provided a rotor arrangement for a wind turbine generator. The rotor arrangement comprises a cylindrical ring structure arranged to rotate around a rotational axis, the cylindrical ring structure comprising: a plurality of ring-shaped permanent magnet packages arranged coaxially around the rotational axis, a plurality of tie rods extending axially through the plurality of permanent magnet packages to join the plurality of permanent magnet packages together; and one or more spacer components, located adjacent to an axially outer end package of the plurality of ring-shaped permanent magnet packages, against which one or more retaining elements of the rotor arrangement bear to retain the permanent magnet packages on the plurality of tie rods. The one or more spacer components at the end packages may be configured to act as an impeller as the rotor rotates, in use, thereby to cause air to flow in a radial direction across the adjacent end package.

According to another aspect of the invention, there is provided a wind turbine generator comprising a rotor arrangement as described in a previous aspect of the invention.

The wind turbine generator may, for example, comprise a stator arrangement defining a central hollow portion within which the rotor arrangement rotates.

According to a further aspect of the invention there is provided a wind turbine comprising a rotor arrangement as described in a previous aspect of the invention or a wind turbine generator as described in another previous aspect of the invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The above and other aspects of the invention will now be described, by way of example only, with reference to the accompanying drawings, in which.

Note that features that are the same or similar in different drawings are denoted by like reference signs.

SPECIFIC DESCRIPTION

In overview, the invention provides a rotor arrangement for a wind turbine generator, such as an IPM electric machine. The rotor arrangement features a plurality of ring-shaped permanent magnet packages that are joined together in a cylindrical structure with spacer components arranged between adjacent pairs of the magnet packages, thereby spacing the magnet packages apart and retaining supported magnets within the respective packages.

With this arrangement, the spacer components effectively define radial gaps, or channels, that extend between the adjacent magnet packages and through which air can flow for cooling purposes.

To enhance the effective cooling, the spacer components of the present invention are advantageously configured to act as an impeller, as the rotor rotates, effectively pumping air through the radial channels, past the magnet packages, and towards a surrounding stator of the generator.

As shall become clear, the spacer components may take various suitable forms for this purpose and may, for example, include a set of impeller-shaped spacer components arranged circumferentially around, and between, the magnet packages to suitably meet oncoming air as the rotor rotates and accelerate that air in a radial direction through the gaps between the magnet packages.

It is envisaged that the invention will provide improved cooling of the rotor and stator, as well as hot spot reduction, and that the invention may reduce, or eliminate, the need for ancillary air pumping systems, such as internal cooling fans. It is envisaged that improved generator cooling may realise the opportunity to run the generator at higher power levels.

A specific embodiment of the invention will now be described in which numerous features will be discussed in detail in order to provide a thorough understanding of the inventive concept as defined in the claims. However, it will be apparent to the skilled person that the invention may be put into effect without the specific details and that in some instances, well known methods, techniques and structures have not been described in detail in order not to obscure the invention unnecessarily.

Figure 1:
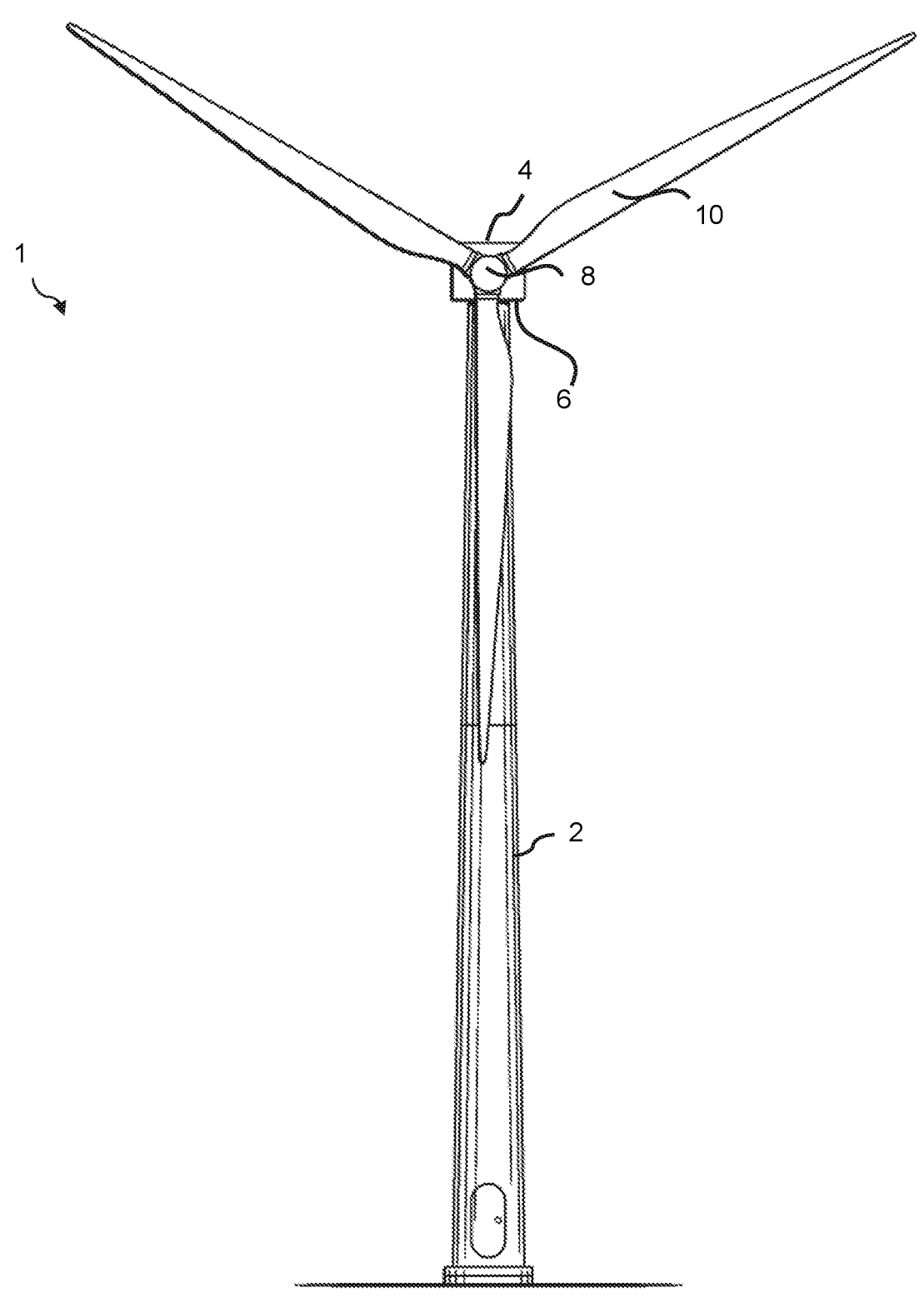
FIG. 1 is a front view schematic diagram showing a typical wind turbine.

In order to place the embodiments of the invention in a suitable context, reference will firstly be made to FIG. 1, which illustrates a typical Horizontal Axis Wind Turbine (HAWT) 1 in which a generator rotor arrangement according to an embodiment of the invention may be implemented.

The wind turbine 1 comprises a tower 2, a nacelle 4 rotatably coupled to the top of the tower 2 by a yaw system (not shown), a rotor hub 8 mounted to the nacelle 4 and a plurality of wind turbine rotor blades 10 coupled to the rotor hub 8. The nacelle 4 and the rotor blades 10 are turned and directed into the wind direction by the yaw system.

Although this particular image depicts an on-shore wind turbine, it will be understood that equivalent features will also be found on off-shore wind turbines. In addition, although the wind turbines are referred to as 'horizontal axis', it will be appreciated by the skilled person that for practical purposes, the axis is usually slightly inclined to prevent contact between the rotor blades 10 and the wind turbine tower 2 in the event of strong winds.

The nacelle 4 houses many functional components of the wind turbine 1, including the generator, gearbox, drive train and rotor brake assembly, as well as convertor equipment for converting the mechanical energy of the wind into electrical energy for provision to the grid.

Figure 2:
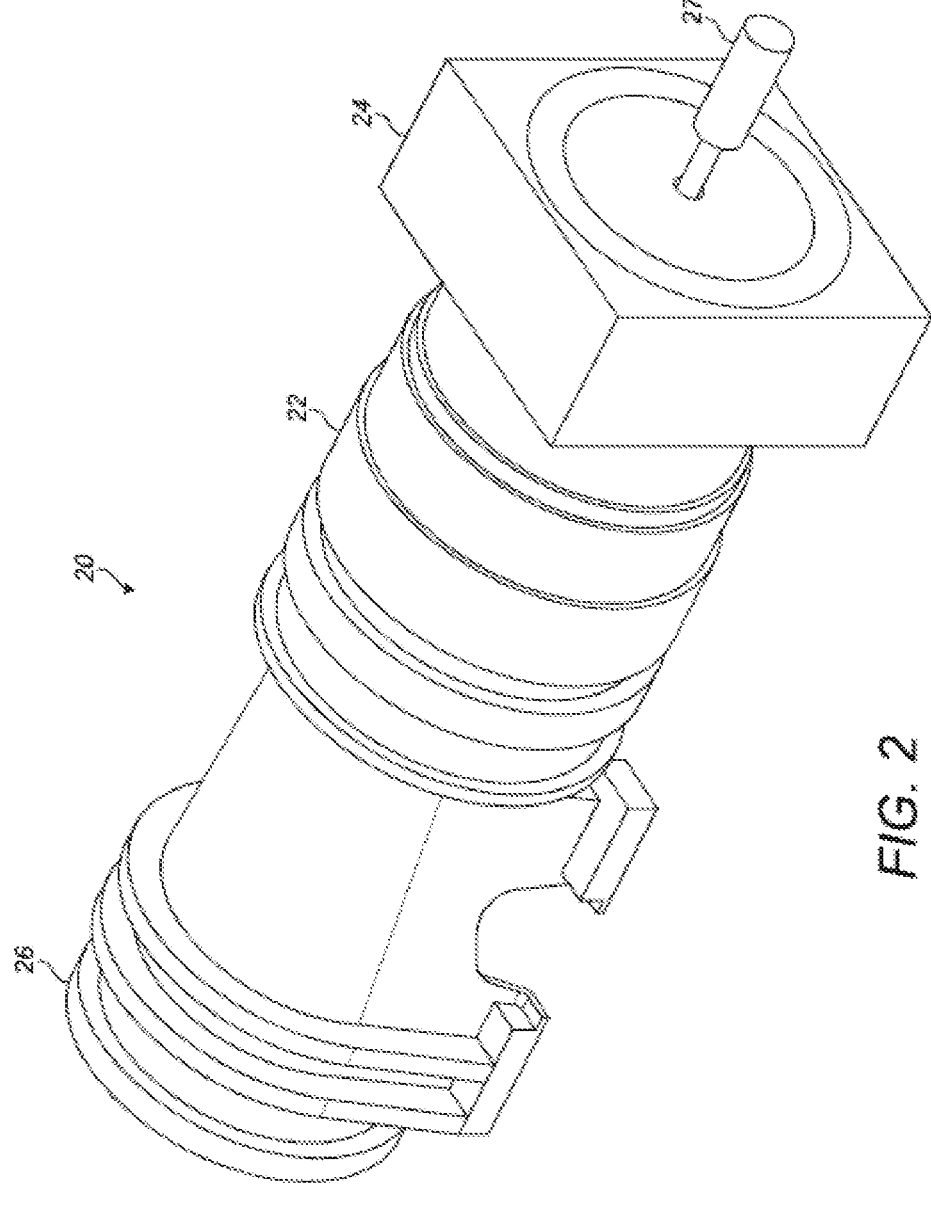
FIG. 2 is a perspective view of the main functional components housed within a nacelle of a typical wind turbine.

With reference to FIG. 2, the nacelle 4 may comprise various powertrain components including a shaft housing 20, a gearbox 22 and a generator 24. A main shaft 26 extends through the shaft housing 20, and is supported on bearings (not shown). The main shaft 26 is connected to, and driven by, the rotor hub 8 and provides input drive to the gearbox 22. The gearbox 22 steps up the rotational speed of the low speed main shaft via internal gears (not shown) and drives a gearbox output shaft. The gearbox output shaft in turn drives the generator 24, which converts the rotation of the gearbox output shaft into electricity. The electricity generated by the generator 24 may then be converted by other components (not shown) as required before being supplied to an appropriate consumer, for example an electrical grid distribution system. So-called "direct drive" wind turbines that do not use gearboxes are also known. The gearbox may therefore be considered optional.

Figure 3:
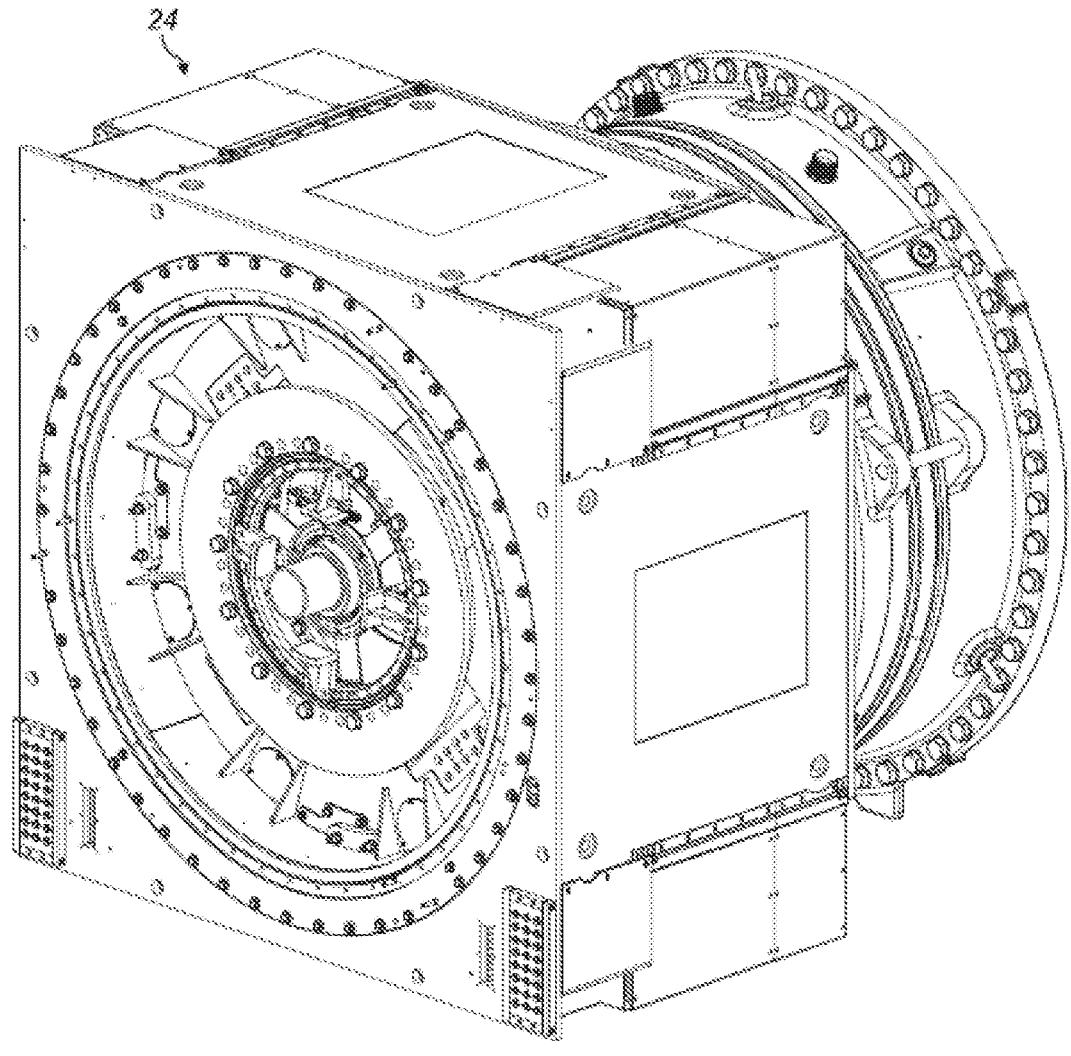
FIG. 3 is an perspective view of the generator of the nacelle of FIG. 2, coupled to a gearbox.

FIG. 3 shows the generator 24 in more detail. In this example, the housing of the last stage of the gearbox 22 is also shown.

With reference firstly to the gearbox 22, a gearbox housing is generally cylindrical in form and is oriented such that its major rotational axis is horizontal, in the orientation of the drawings. The cylindrical configuration of the gearbox housing is due to the specific type of gearbox that is used in the illustrated example, which is an epicyclic gearbox. As the skilled person would know, an epicyclic gearbox comprises a series of planet gears that are arranged about a central sun gear, and which collectively are arranged within an encircling ring gear. The ratio of the number of teeth between the ring gear, the planet gear and the sun gears determines the gear ratio of the gearbox. For clarity, fine detail of the gearbox will not be described in further detail here as the gearbox is not the principal subject of the invention. Suffice to say that other gearbox configuration could also be used, although it is currently envisaged that an epicyclic gearbox provides an elegant solution fit for the confines of a wind turbine nacelle.

The output shaft of the gearbox 22 interfaces with a rotor 32 of the generator 24. As such, the major axis of the gearbox output shaft defines the rotational axis of the generator 24.

Figure 4:
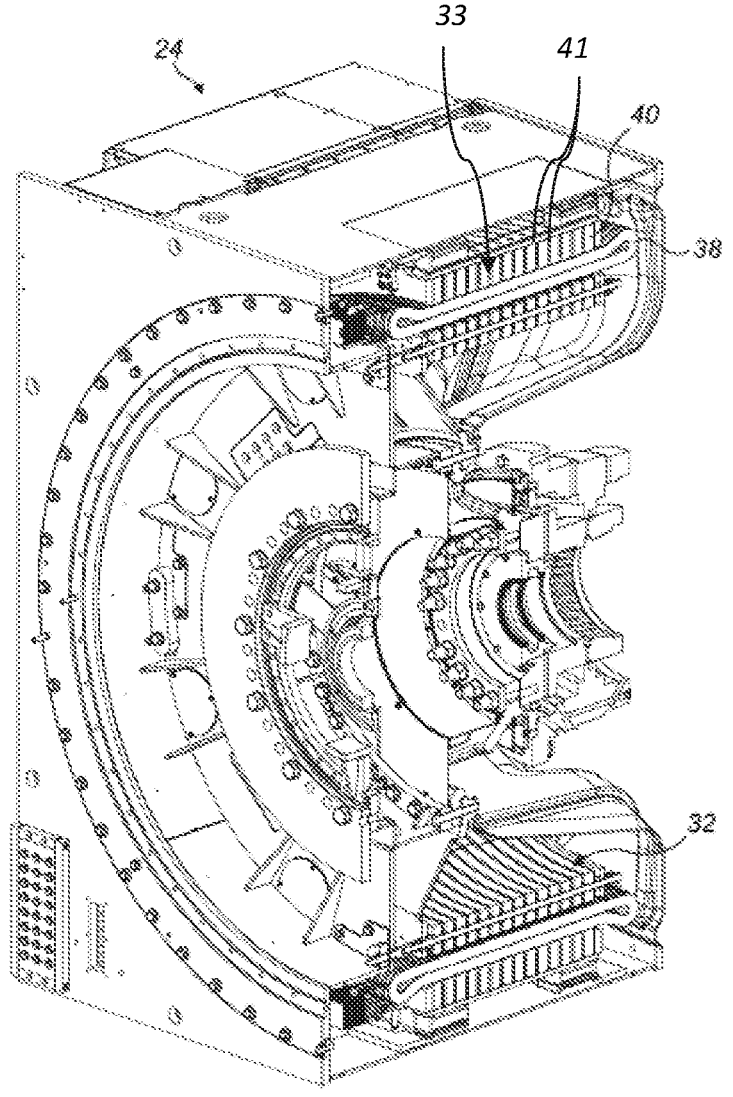
FIG. 4 is a cutaway view of the generator of FIG. 3.

In FIG. 4, a cutaway view of the generator 24 is provided. The generator 24 is intended to provide a non-limiting example within which a generator rotor arrangement according to an embodiment of the invention may be implemented.

In the illustrated embodiment, the generator 24 is an IPM (interior permanent magnet) electric machine having an external stator 33, which surrounds the rotor 32.

In this example, the generator 24 is enclosed by a housing that may be effectively sealed to define a closed air coolant system. Although not shown in FIG. 4, the housing may therefore also include a cooling means, such as an air to liquid heat exchanger, and one or more internal cooling fans. Such cooling fans are configured to drive the air within the housing to flow in a circuit that passes cyclically through the generator 24 and the cooling means in order to transfer heat away from the generator 24. However, this arrangement is not intended to be limiting on the invention.

Although the invention is not limited to a specific type of stator, the example stator 33, shown in FIG. 4, includes stator windings 38, a stator core 40, and a generator housing which surrounds and supports the stator windings 38 and the stator core 40. Advantageously, the stator core 40 also includes a plurality of channels 41 that extend radially through the stator core 40, allowing air to pass therethrough to cool the stator windings 38.

The invention principally relates to embodiments of the rotor 32, which are described in further detail below with reference to FIGS. 5 to 12.

Figure 5:
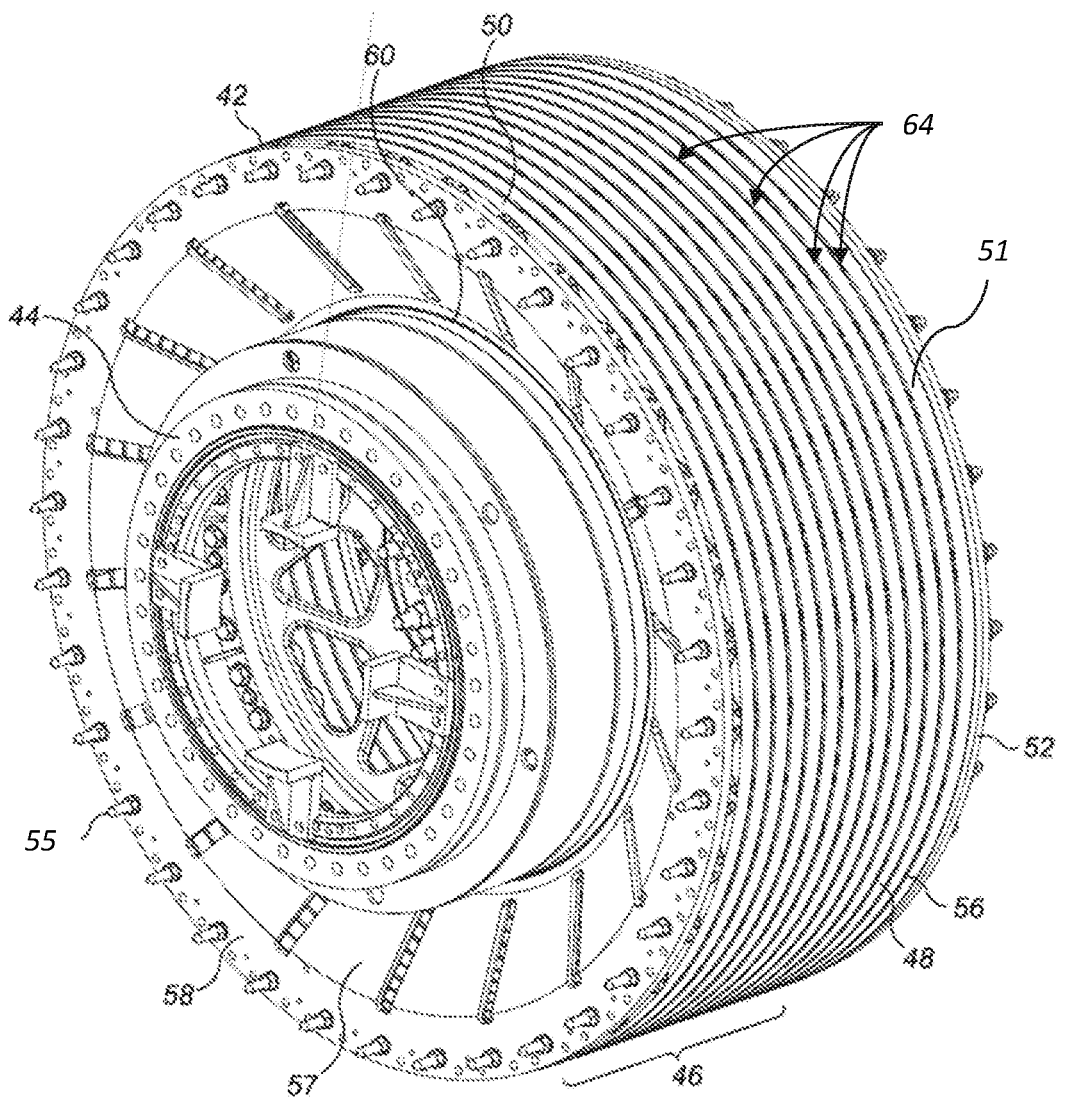
FIG. 5 is a non-drive end perspective view of a rotor arrangement of the generator, shown in FIG. 3, in accordance with an embodiment of the invention, interfaced with a connector.
Figure 6:
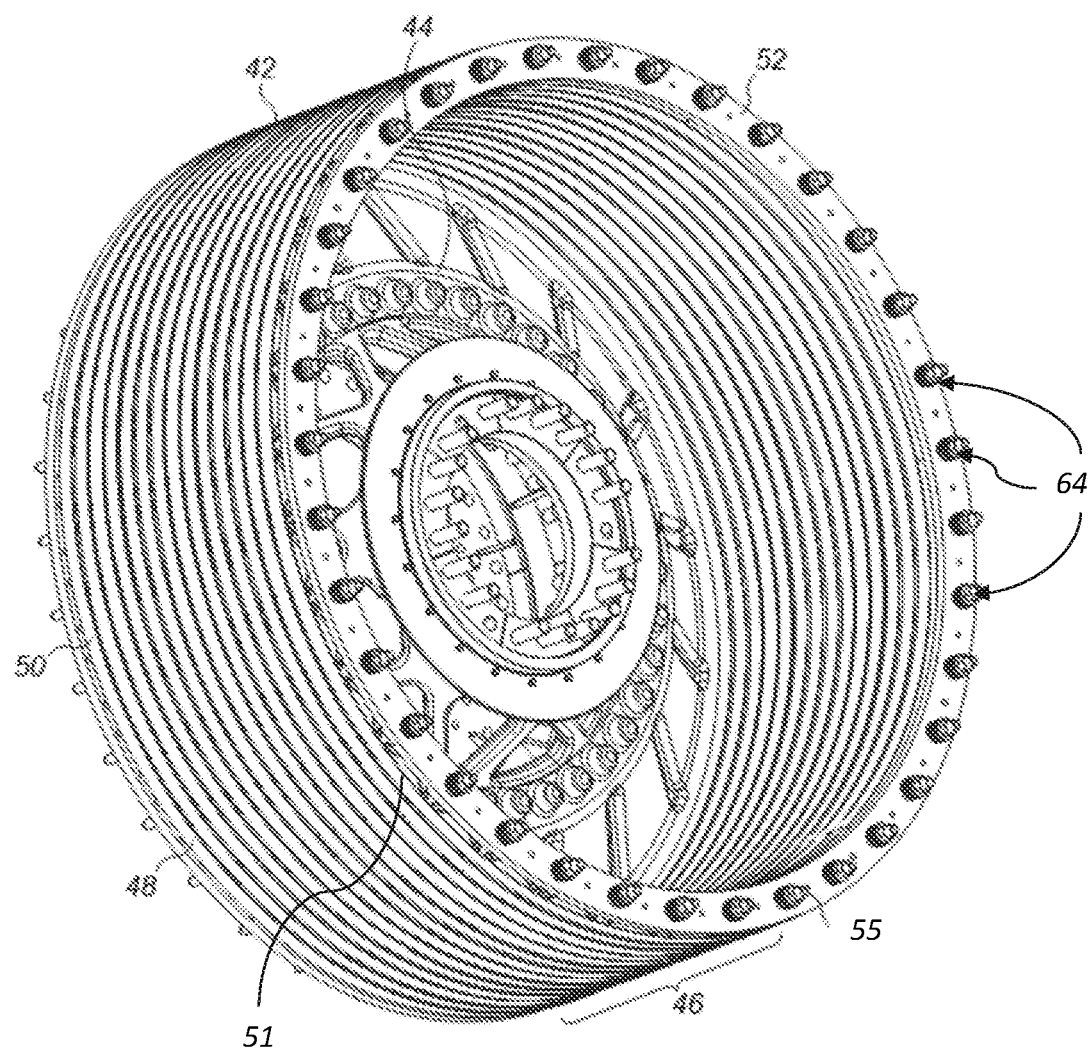
FIG. 6 is a drive end perspective view of the rotor arrangement shown in FIG. 5.

As shown in FIGS. 5 and 6, the rotor 32 includes a rotor arrangement 42, which is generally made up of a cylindrical ring structure 46 arranged to rotate on a rotational axis.

Notably, the rotor arrangement 42 does not include a central hub that extends through the cylindrical ring structure 46 for connection to a drive shaft, such as the output shaft of the gearbox. Instead, the rotor arrangement 42 is constructed to define a central hollow portion, or open space, that extends through the ring structure 46 and, in this respect, includes a ring-shaped flange 57 at an end of the cylindrical ring structure 46, which features a rotor connection portion 58 for attachment to the end of the cylindrical ring structure 46, and a drive shaft connection portion 60, configured to connect the cylindrical ring structure 46 to the gearbox output shaft. As shown here, the rotor arrangement 42 is also interfaced with a connector 44 (see FIG. 5) for further parts, such as a brake disc.

The absence of a central hub results in a number of important benefits, such as reduced cost and weight and improved airflow for cooling the generator 24, as shall be described in more detail below.

The cylindrical ring structure 46 itself is shown to include a plurality of ring-shaped permanent magnet packages 48 that are joined together by a plurality of tie rods 55. The tie rods 55 extend axially through the magnet packages 48, with an arrangement of spacer components 64 between adjacent pairs of the magnet packages 48 to space the magnet packages 48 apart along the tie rods 55, as shown in FIGS. 5 and 6. As shall be described in more detail, the spacer components 64 serve several advantageous purposes within the context of the invention, which include enhancing the effective cooling of the generator 24.

In this example, each permanent magnet package 48 is generally ring-shaped, or annular, and holds a plurality of interior permanent magnets (not shown in FIGS. 5 and 6). The plurality of interior permanent magnets are received in respective pairs of magnet holes (not shown in FIGS. 5 and 6) arranged around the circumference of the ring-shaped package 48, which establish magnetic poles of the rotor arrangement 42. In other examples, the number of permanent magnets used to provide respective magnetic poles may vary.

The ring-shaped structural body of each permanent magnet package 48 may be formed by a solid ring or an assembled stack of coaxial ring-shaped segmented layers, as in the example in FIG. 5. The stack of ring-shaped segmented layers may be used where it is not feasible to manufacture the magnet package 48 from a solid ring, for example.

Where the structural body is provided by an assembled stack of ring-shaped segmented layers, each ring-shaped layer may be formed of a plurality of contiguous segment sheets arranged around the rotational axis. The ring-shaped layers may be arranged so that the segment sheets are staggered on successive layers to provide similar strength to a solid ring, as may be necessary, for example, to withstand centrifugal (and other) forces applied to the permanent magnet package in a typical wind turbine generator.

The permanent magnet packages 48 are arranged coaxially around the rotational axis and may therefore extend in series between two end packages, such as a first end package 50 and a second end package 51, arranged at opposite ends of the cylindrical ring structure 46.

In the example shown in FIGS. 5 and 6, the first end package 50 is located at a non-drive end of the cylindrical ring structure 46, which faces away from the wind turbine driveline when the wind turbine is in use. The second end package 51 is located at a drive end of the cylindrical ring structure 46, which faces toward the driveline when the turbine is in use. A non-drive end view of the rotor arrangement 42 can be seen in FIG. 5 and a drive end view of the rotor arrangement 42 can be seen in FIG. 6.

In the example shown, all of the permanent magnet packages 48 are of equal circumference and thickness. However, in other examples, the thickness of the permanent magnet packages 48 may vary with respect to one another. For example, the rotor arrangement 42 may comprise permanent magnet packages 48 of two or more different thicknesses. The permanent magnet packages 48 of different thicknesses may, for example, be arranged alternately within the cylindrical ring structure 46.

Furthermore, in this example, the end packages 50, 51 take the same form as any other permanent magnet package 48 in the cylindrical ring structure 46, with the sole exception that they are provided at respective ends of the cylindrical ring structure 46. However, in other examples, one or both of the end packages 50, 51 may have a greater thickness than the other permanent magnet packages 48. Additionally, or alternatively, the end packages 50 may further comprise additional features for allowing connection of the cylindrical ring structure 46 to other parts of the generator or a coating that covers the outer surfaces of the cylindrical ring structure 46.

As mentioned previously, once assembled, the permanent magnet packages 48 are joined together by the plurality of tie rods 55, with the spacer components 64 arranged between adjacent pairs of the magnet packages 48 and/or adjacent to the end packages 50, 51.

To accommodate such connection, the magnet packages 48 comprise a plurality of tie rod holes which extend axially through the permanent magnet packages 48 for receiving respective ones of the plurality of tie rods 55, as shown in FIGS. 5 and 6. The holes are arranged circumferentially around the body of each of the permanent magnet packages 48 and may be spaced apart by an equal distance, i.e. at regular angular intervals, for example.

In the example shown in FIGS. 5 and 6, a tie rod hole is arranged between each respective pair of magnet holes. However, in other examples, the arrangement may differ. Preferably though, the number of magnetic holes may be a multiple of the number of tie rods 55 or tie rod holes.

The holes of axially adjacent permanent magnet packages 48 are complementary in size and position to one another, such that each tie rod 55 may extend through a series of respective tie rod holes in successive ones of the magnet packages 48 to join the magnet packages 48 together and form the cylindrical structure 46. In this manner, the tie rod holes may effective define a plurality of tie rod bores that extend through the cylindrical ring structure 46, from the first end package 50 to the second end package 51, and possibly also through any additional structural elements that are directly connected to the cylindrical ring structure 46, such as the end ring 52, which does not include any magnets itself.

It shall be appreciated that the structure of the rotor arrangement 42 may therefore enable a modular approach, in which any desirable type and number of permanent magnet packages 48 can be added to, or removed from, the cylindrical ring structure 46.

The ring-shaped flange 57 may then be attached to the cylindrical ring structure 46 using the tie rods 54, for example, to connect the cylindrical ring structure 46 to the drive shaft. More specifically, the rotor connection portion 58 of the ring-shaped flange 57 may be attached to the first end package 50 by the tie rods 54, as shown in FIG. 5, so that the rotor arrangement 42 may be attached to the drive shaft without a central hub running through the cylindrical ring structure 46. Consequently, air provided centrally to the generator 24 can flow through, and thereby cool, the rotor arrangement 42. Such provisions contribute to the enhanced cooling provided by the present invention.

The above discussion necessarily provides significant detail regarding a specific form of annular rotor arrangement. However, the skilled person would understand that various features may be inessential or may be implemented in a different form. In essence, however, the rotor arrangement involves a cylindrical ring structure defined by an arrangement of annular magnet packages supported on a set of tie rods with spacer means arranged between the magnet packages.

The enhanced cooling capabilities of the present invention are principally derived from the arrangement of spacer components 64 within the rotor arrangement 42, which shall now be described in more detail with additional reference to FIGS. 7 to 9.

Figure 7:
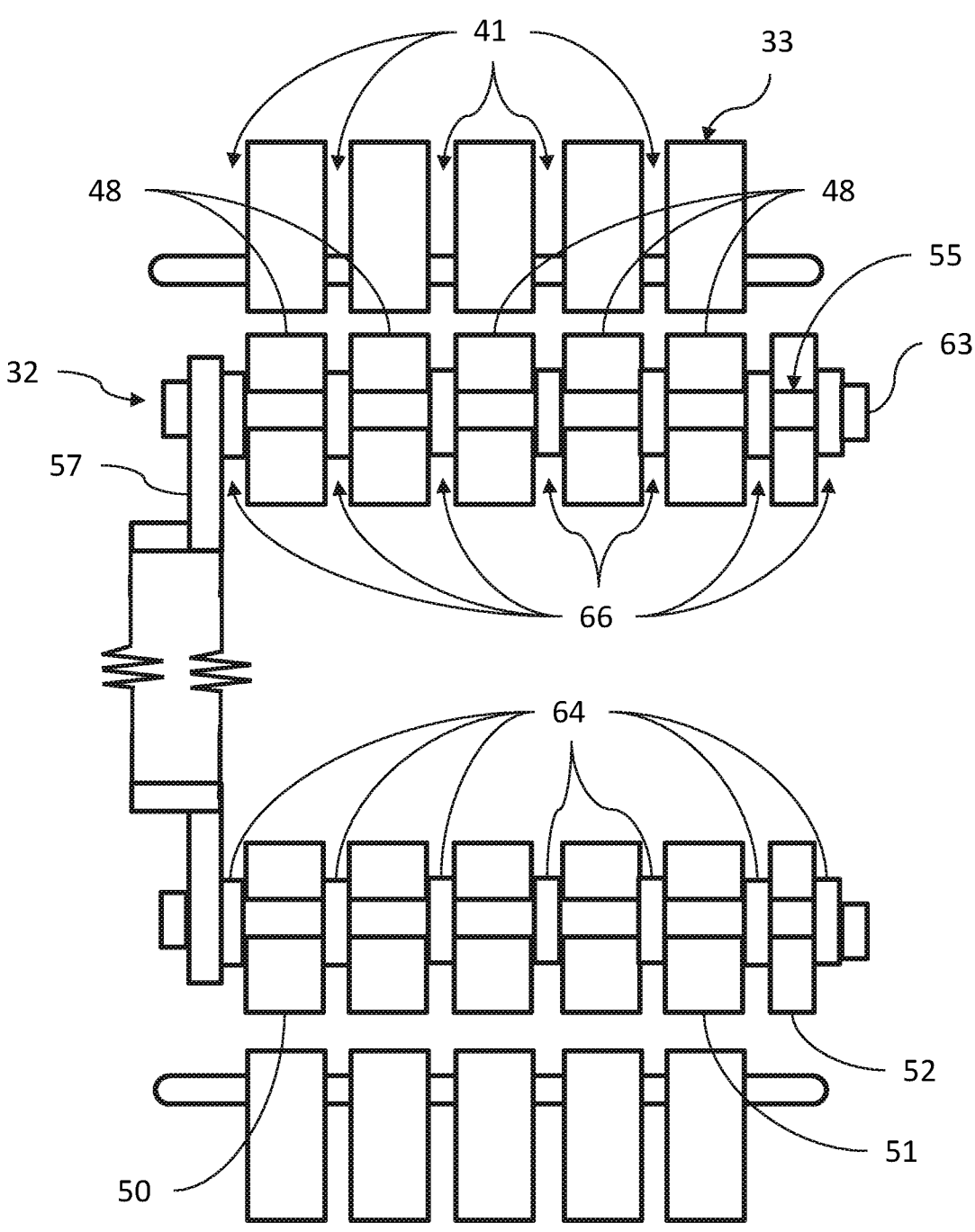
FIG. 7 is a schematic illustration, in section form, of the rotor arrangement shown in FIG. 5.

FIG. 7 provides a simplified schematic illustration of an arrangement of spacer components 64 within the rotor arrangement 42, in accordance with an embodiment of the invention. As shown in FIG. 7, the spacer components 64 may generally be arranged between adjacent permanent magnet packages 48, where the spacer components 64 hold adjacent packages 48 apart. The spacer components 64 may additionally, or alternatively, be arranged at respective ends of the cylindrical ring structure 46, where the spacer components 64 may act as intermediate bushes against which other retaining elements may bear to retain the magnet packages 48 on the tie rods 55. For example, such retaining elements may include the ring-shaped flange 57 or mechanical fastening elements 63, such as nuts for the tie rods 55, which bear against the spacer components 64 to apply the necessary compression that holds the permanent magnet packages 48 together.

In examples of the invention, the spacer components 64 may be arranged into a series of axial layers that space adjacent bodies of the cylindrical ring structure 46 apart. For example, as best shown in FIG. 7, the arrangement of spacer components 64 may include a first layer of spacer components 64 provided between the first end package 50 and the ring-shaped flange 57, second, third and fourth layers of spacer components 64 arranged between successive adjacent pairs of the magnet packages 48 between the first end package 50 and the second end package 51, a fifth layer of spacer components 64 arranged between the second end package 51 and the end ring 52, and a sixth layer of spacer components 64 arranged between the end ring 52 and the fastening elements 63.

It shall be appreciated that FIG. 7 is a simplified schematic view though. Hence, the rotor arrangement is compacted in the radial direction and the illustrated number of magnet packages 48 and spacer components 64 does not necessarily reflect the numbers that would be present in an actual implementation of the rotor arrangement 42.

By spacing the adjacent magnet packages 48 apart, the spacer components effectively define intermediate radial channels 66, or gaps, that extend radially through the cylindrical ring structure 46 of the rotor arrangement 42. Such radial channels 66 allow air that is provided to the central hollow portion of the generator 24 to flow through the rotor arrangement 42 and between the magnet packages 48. The air is therefore able to flow through the radial channels 66 of the rotor 32 in order to transfer heat away from the magnet packages 48.

As shown in this example, the radial channels 66 of the rotor arrangement 42 may advantageously be aligned with the respective radial channels 41 in the stator 33. Accordingly, the air flowing through the radial channels 66 of the rotor arrangement 42 may subsequently flow through the respective radial channels 41 in the stator 33 to effectively cool the stator 33 as well.

The radial channels 66 defined by the spacer components 64 therefore provide a degree of passive cooling. However, embodiments of the present invention are advantageously configured to provide enhanced generator cooling by providing active cooling, as the rotor arrangement 42 rotates.

In particular, according to embodiments of the present invention, the arrangement of spacer components 64 may be advantageously configured to act as an impeller, and to drive the airflow across, and between, the magnet packages 48 of the rotor 32, as the rotor arrangement 42 rotates. In this manner, the spacer components 64 effectively pump air through the radial channels 66, actively generating/increasing the radial airflow using a portion of the rotational energy of the rotor 32.

Figures 8, 9:
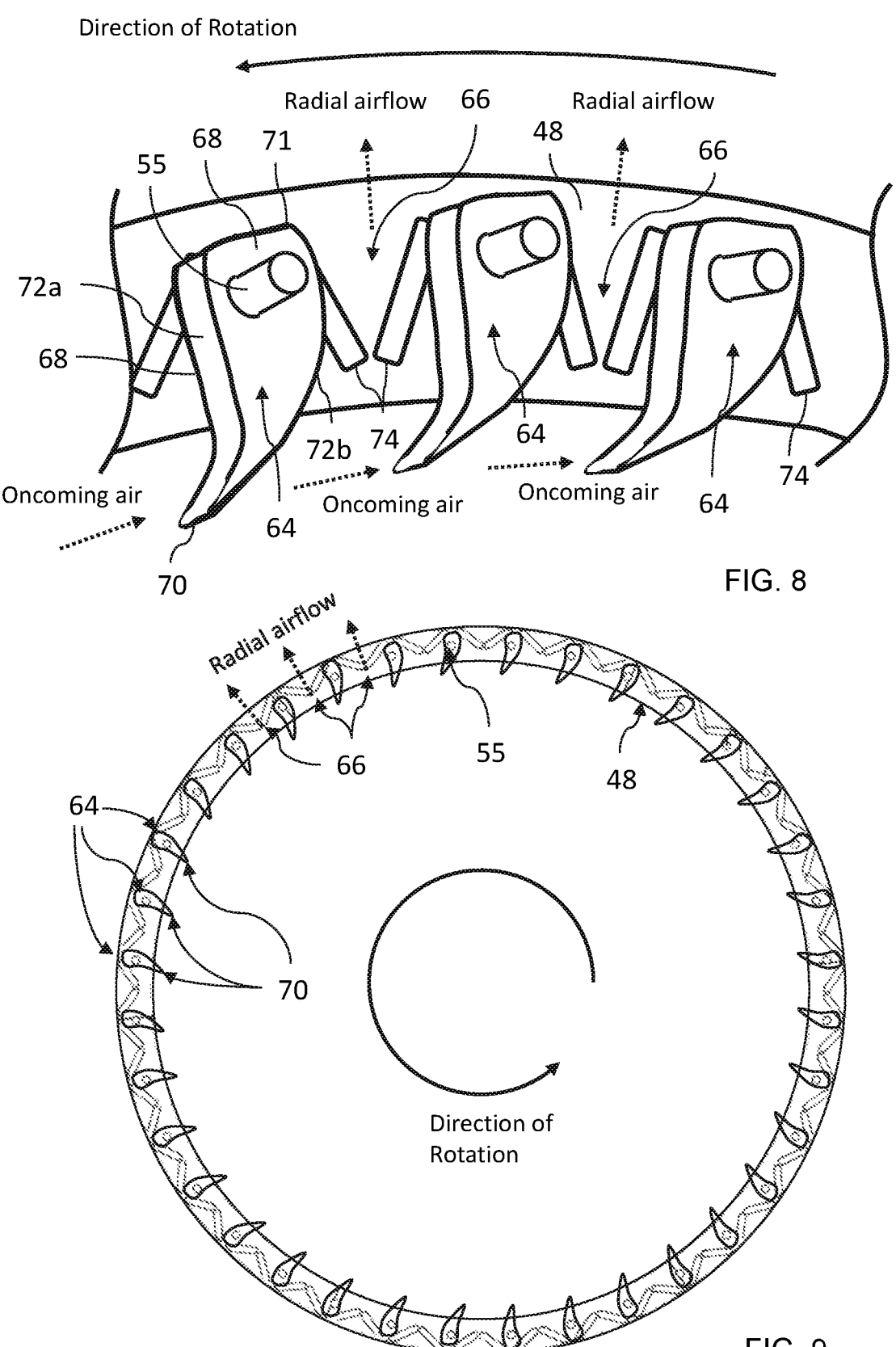
FIG. 8 is a detailed view of the rotor arrangement, as shown in FIG. 5, illustrating example spacer components of the rotor arrangement arranged adjacent to a ring-shaped permanent magnet package of the rotor arrangement in accordance with an embodiment of the invention.
FIG. 9 is an end view of the rotor arrangement, shown in FIG. 5, schematically illustrating the spacer components, shown in FIG. 7, in front of, and adjacent to, the ring-shaped permanent magnet package in accordance with an embodiment of the invention.

FIGS. 8 and 9 are provided to illustrate the spacer components 64 and their arrangement within each layer. More specifically, FIG. 8 provides a detailed view of a selection of such spacer components 64 and FIG. 9 illustrates an example arrangement of the spacer components 64 between the first end package 50 and the adjacent magnet package 48 in the second layer.

As shown in FIG. 8, each spacer component 64 may take the form of a plate-like element, having a pair of opposing planar surfaces 68 configured to engage, and bear against, opposing surfaces of an adjacent body, such as the adjacent permanent magnet packages 48. For this purpose, the spacer components 64 may be formed of a suitably resilient material configured to maintain the axial separation between the adjacent bodies against the compressive force applied by the tie rods 55. It shall be appreciated that suitable materials are non-magnetic/non-ferrous, such as aluminium, stainless steel, nylon or Polyether Ether Ketone (PEEK).

To provide the desired impeller function, each spacer component 64 may have an aerodynamic shape, like that of an impeller element/blade, extending radially outward from a leading edge 70 to a trailing edge 71 and thereby defining a chord line, or a longitudinal axis, that extends therebetween. Along its length, the spacer component 64 may define a number of shapes suitable for providing the impeller function, ranging from a thin, blade-like, profile to a broader aerofoil shape, like the example shown in FIG. 8, which shall now be described in more detail.

As shown in FIG. 8, the example spacer component 64 narrows towards the leading edge 70 to define a pointed end (with a relatively small nose radius) and expands towards the trailing edge 71 to define a bulbous end (having a relatively large nose radius).

The leading edge 70 of each spacer component 64 is configured to meet oncoming air as the rotor 32 rotates and to guide the oncoming air onto one or more air guiding surfaces 72 of the spacer component 64 that extend along the sides of the spacer component 64. The air guiding surfaces 72 are shaped to guide, and accelerate, the oncoming air in a radial direction, as the rotor 32 rotates.

For example, as shown in FIG. 8, each spacer component 64 may include a first air guiding surface 72a that extends along a first side of the space component and a second air guiding surface 72b that extends along an opposing second side of the spacer component 64. The first side may face in the direction of rotation, effectively facing the oncoming air, as a so-called 'oncoming side' or 'pressure side'.

To guide, and accelerate, the oncoming air in a radial direction, as the rotor 32 rotates, the first and second air guiding surfaces 72a,b may each be curved, and/or arcuate, with the first air guiding surface being (at least partially) concave and the second air guiding surface being (at least partially) convex.

In the example shown in FIG. 8, the first air guiding surface 72a of each spacer component 64 is curved in a concave manner in a first portion that extends from the leading edge 70 towards a point of maximum camber. This concave portion is particularly suited to guiding the oncoming air, received at the leading edge 70, in a radial direction. Beyond the point of maximum camber, the first air guiding surface 72a may curve convexly towards the trailing edge 71 such that the spacer component 64 is effectively cambered towards the first 'oncoming' side. The second air guiding surface 72b curves convexly on the other side of the spacer component 64 and, at the point of maximum camber, the orthogonal distance between the first air guiding surface and the longitudinal axis of the spacer component 64 may be twice, or even three times, greater than the orthogonal distance between the longitudinal axis and the second air guiding surface. In this manner, each impeller element may be asymmetric, for example such that the first air guiding surface 72a is shaped to accelerate air more effectively in a radial direction.

The shape of the first and second air guiding surfaces 72a,b, shown in FIG. 8, is particularly suited to driving the airflow in a radially outward direction as the rotor arrangement 42 rotates. However, it shall be appreciated that the spacer component 64 may take various suitable shapes to provide the desired impeller function and, in other examples, the first air guiding surface 72a may simply define a concave surface, whilst the second air guiding surface 72b defines a convex surface, as above. Furthermore, in other examples, the air guiding surfaces 72 may be substantially planar and the spacer components 64 may be symmetric.

As shown in FIG. 8, the spacer components 64 may each be arranged on a respective tie rod 55 and include a respective bore hole, through which that tie rod 55 is received. Once located in position, each spacer component 64 may, at least partially, overlap the adjacent magnet holes 74, as shown in the example in FIG. 8, so that the planar surfaces 68 of the spacer component 64 effectively provide a retaining wall that extends over the adjacent magnet holes 74. In this manner, the spacer components 64 may substantially inhibit axial movement of the adjacent permanent magnets and/or prevent the permanent magnets from falling out of the packages 48. For this purpose, the spacer components 64 may be relatively wide towards the trailing edge

71, as shown in this example. For example, the spacer component 64 may expand away from the leading edge 70 such that the width of the spacer component 64, which is defined by the distance (orthogonal to the longitudinal axis) between the first and second air guiding surfaces, is maximised at a distal point from the leading edge 70. For context, the maximum width may be at least 60%, or even 75%, of the distance along the length of the spacer component 64, from the leading edge 71. The width may be large enough to extend at least partially across the pair of adjacent magnet holes 74, but minimised for air guiding purposes. Hence, in examples, the maximum width of each spacer component 64 may be up to 40% of the length of the spacer component 64 between the leading and trailing edges 70, 71.

In order to effectively locate, and retain, the spacer components 64 in position against the adjacent magnet packages, each spacer component 64 may include a pair of locking formations (not shown) that extend from the planar surfaces 68 of the spacer component 64 in an axial direction to engage the adjacent pair of magnet holes 74. It shall be appreciated that the spacer components 64 are subjected to various inertial and aerodynamic forces as the rotor arrangement 42 rotates, in use, and the locking formations act to effectively hold the spacer component 64 in position against such forces. In other examples, the spacer components 64 may be suitably held in position by other means, for example by an adhesive, or by friction at the interfacing surfaces, which may be sintered for further frictional resistance.

As illustrated in FIG. 9, each layer of spacer components 64 may be arranged on the respective tie rods 55 to define a multitude of impeller elements arranged around the circumference of the adjacent permanent magnet packages 48. Collectively, the impeller elements effectively pump air from the central hollow portion of the cylindrical ring structure 46, through the radial channels 66, and towards the stator 33, as the rotor 32 rotates. Consequently, the radial airflow generated passes across the adjacent permanent magnet packages 48 and acts to transfer heat away from the rotor 32.

For this purpose, each spacer component 64 may generally extend in a radial direction, preferably arranged so that the chord line or longitudinal axis, defined between the leading and trailing edges 70, 71 of the spacer component 64, is backwardly inclined with respect to the direction of rotation of the rotor arrangement 42. In other words, inclined to a radial axis of the ring structure 42 away from the direction of rotation so that the trailing edge 71 is circumferentially offset from the leading edge in a direction that opposes the direction of rotation.

In this example, the rotor arrangement 42 is configured to rotate anti-clockwise in use, and so the trailing edge 71 of each spacer component 64 is circumferentially offset from the leading edge 70 in the clockwise direction. It shall be appreciated that a backward inclination is suitable for generating a radially outward airflow, whilst a forward inclination may be suitable for generating a radially inward airflow.

To generate a suitable radially outward airflow, the longitudinal axis of each spacer component 64 may, for example, be backwardly inclined to the radial direction by an angle of between 30 degrees and 60 degrees, depending on the typical rotational speed of the rotor arrangement 42. For context, in an example, the longitudinal axis of the impeller element may be inclined to the radial direction by 42 degrees in order to produce the desired radially outward airflow.

To further optimise the impeller effect, the leading edge 70 of each spacer component 64 may be advantageously arranged to extend into the central hollow portion of the cylindrical ring structure 46. In this manner, the leading edge 70 of the spacer components 64 is configured to meet air that is ordinarily flowing axially through the central hollow portion, as the rotor arrangement 42 rotates, and to redirect, or otherwise pump, that air in a radial direction through the radial channels of the rotor 32. For context, the spacer components 64 may be arranged so that the leading edge 70 and as much as 20% of the length of each spacer component 64 may protrude radially inward beyond an inner circumferential edge of the adjacent magnet packages 48. For this purpose, each spacer component 64 may be longer than the width of the adjacent ring-shaped permanent magnet package 48, where the width of the adjacent permanent magnet package 48 is the distance between the inner circumferential edge and an outer circumferential edge of that magnet package 48. For example, the length of each spacer component 64 may be at least 20% longer than the width of the adjacent permanent magnet package 48, preferably at least 60% longer than the width of that package 48, but generally not more than 80% longer than the width of that package 48.

Furthermore, although not shown in this example, the protruding portion of each spacer component 64 may be thicker than the rest of the spacer component 64. For example, each spacer component 64 may include an axial expansion, or lip, at the protruding portion, which may be configured to abut against the inner circumferential edge of at least one of the adjacent magnet packages 48 to retain the spacer component 64 in position.

A method of operating the generator 24, in accordance with an embodiment of the invention, shall now be described with additional reference to FIG. 10, which shows a simplified schematic view of the rotor arrangement 42 as described in FIG. 7.

Figure 10:
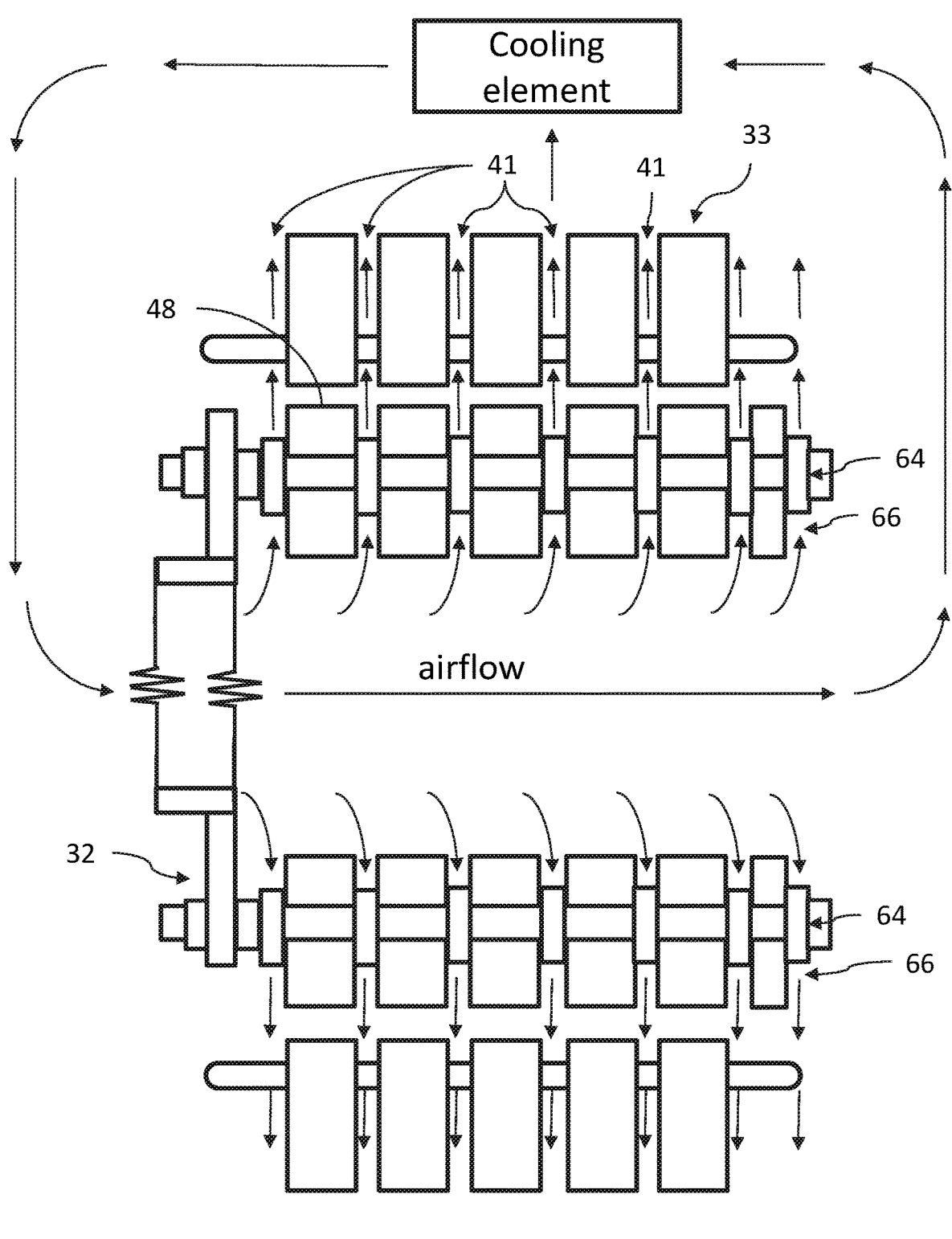
FIG. 10 is a schematic view, in section form, of the rotor arrangement, shown in FIG. 5, illustrating the operation of the rotor arrangement equipped with a spacer component arrangement in accordance with the invention.

It shall be appreciated that air in the generator housing may ordinarily be stationary or flowing axially through the central hollow portion of the cylindrical ring structure 46, as shown in FIG. 10, for example under the influence of internal cooling fans.

In use, the wind turbine rotor blades 10 rotate under the influence of the wind and cause the rotor arrangement 42 of the generator 24 to rotate relative to the stator 33, converting the kinetic energy of the wind into electrical energy and generating heat.

Advantageously however, as the rotor arrangement 42 rotates, the spacer components 64 are moved relative to the air in the central hollow portion and the leading edges 70 of the spacer components 64 draw some of that air away from the central hollow portion and along the air guiding surfaces 72 of the spacer component 64. That air is then accelerated along the air guiding surfaces 72 of the spacer components 64 and redirected in a radially outward direction, as the spacer components 64 effectively pump air from the central hollow portion through the radial channels 66 of the rotor arrangement 42.

In this manner, the spacer components 64 generate a pressure rise through the generator 24 and produce an airflow between the magnetic packages 48 that continues through the radial channels 66 of the rotor 32, into the corresponding radial channels 41 of the stator 33, and onwards toward the cooling means. The generated heat may therefore be extracted by the cooling means before the air is drawn back into the central hollow portion and through the rotor 32 and stator 33, in a cyclical process. In this manner, heat is continuously removed from the rotor 32 and the stator 33 to effectively cool the generator 24 and minimise the system losses.

The invention therefore provides improved cooling of the rotor and/or stator, as well as hot spot reduction, and reduces, or substantially eliminates, the need for ancillary air pumping systems, such as internal cooling fans, allowing the wind turbine generator to be operated at higher power levels.

It will be appreciated that various changes and modifications can be made to the present invention without departing from the scope of the present application.

Figure 11:
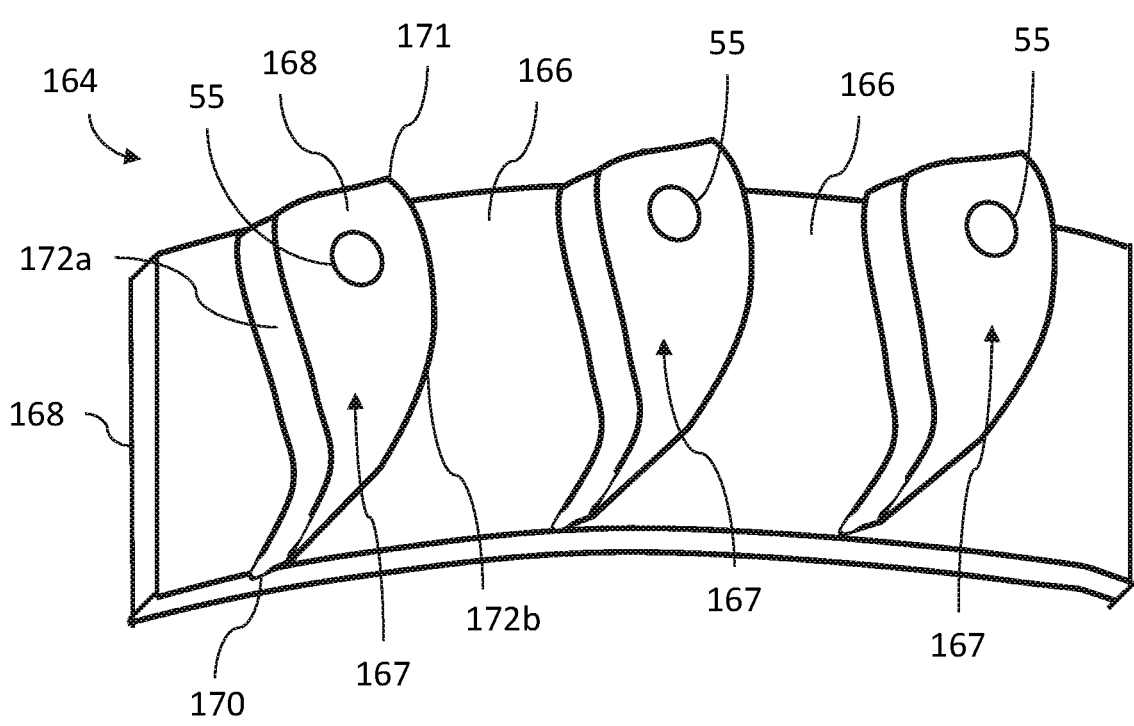
FIG. 11 is a perspective view of a schematic illustration of another example spacer component in accordance with an embodiment of the invention.

In another example, shown in FIG. 11, the spacer components 64 may take the form of one or more circumferentially extending spacer plates 164 instead of, or in addition to, the individual components 64 described previously. It should be noted that counterpart features of the example are assigned similar reference numbers, but incremented by 100 from the previous example.

The spacer plates 164 differ from the individual spacer components 64 in that they extend circumferentially across a plurality of the tie rods 55. For example, each spacer plate 164 may extend partially, or completely, around the circumference of the adjacent magnet package 48 and therefore extend across, and between, multiple tie rods 55.

The spacer plates 164 may be arranged in axial layers between the adjacent permanent magnet packages 48, substantially as described previously. However, it shall be appreciated that the spacer plates 164 effectively span the circumferential gaps between adjacent tie rods 55, which defined the radial gaps 66 in the previous example. Hence, to provide the same active cooling effects, the spacer plates 164 may feature a plurality of radially extending channels 166, as shown in FIG. 11, that are recessed from one, or both, of the planar surfaces 168 of the spacer plate 164 to replicate the radial gaps 66 that the spacer components 64 produce between the adjacent magnet packages 48 in the previous example.

The plurality of radially extending channels 166 may be arranged so that a respective impeller element 167 is defined between each pair of adjacent recessed channels 166 for guiding an airflow radially therethrough. The impeller elements 167 defined by the channels 166 may therefore be substantially as described in the previous example and configured to cause or accelerate an airflow in a radial direction between the adjacent magnet packages 48 and into the respective radial channels 41 extending through the stator 33. For example, as shown in FIG. 11, the plurality of radially extending channels 166 may each be curved to define a corresponding impeller element 167 with first and second air guiding surfaces 172a,b extending between respective leading and trailing edges 170, 171, substantially as described in the previous example.

As shown in FIG. 11, each spacer plate 164 may further differ from that spacer components 64 in the previous example in that the spacer plate 164 may suitably include a plurality of tie rod holes for receiving respective tie rods 55. For consistency with the previous example, it shall be appreciated that each tie rod hole may extend through a respective impeller element 167 such that the recessed channels 166 of the spacer plate 164 extend between adjacent pairs of tie rods 55, as in the previous example.

Figure 12:
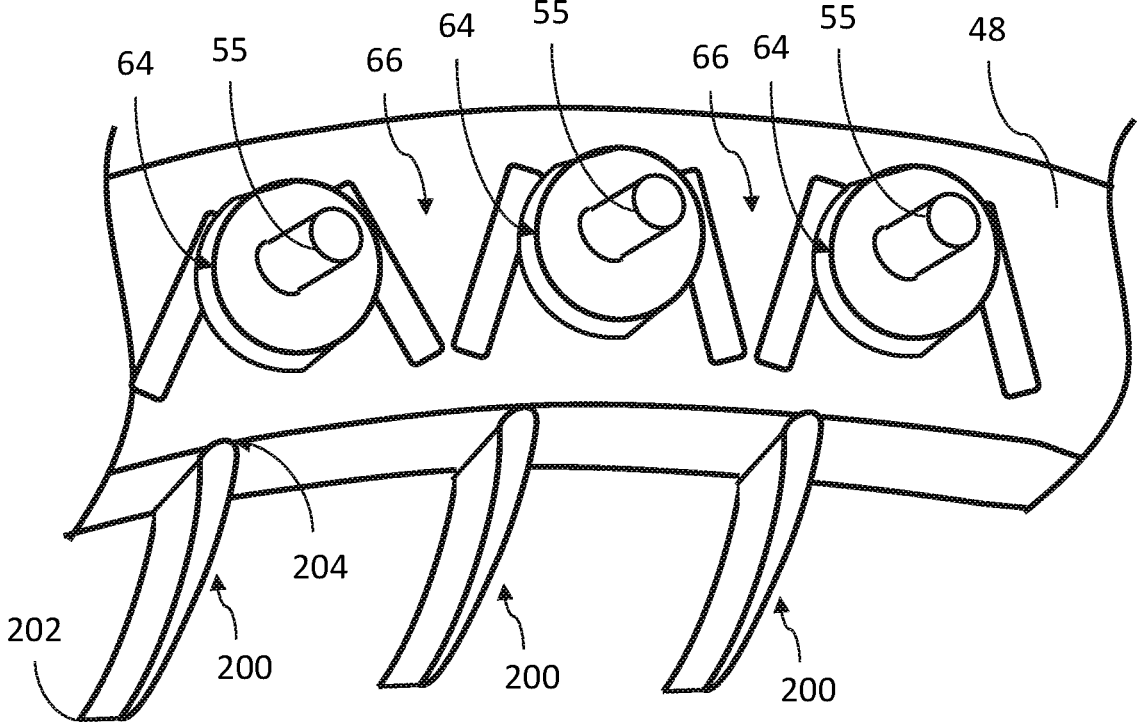
FIG. 12 is a detail view of a schematic illustration of another example rotor arrangement in accordance with an embodiment of the invention.

According to a further embodiment of the invention, shown in FIG. 12, the impeller function may be provided additionally, or alternatively, by a plurality of impeller vanes 200 that are mounted on the rotor arrangement 42, separately to the spacer components 64.

In particular, as shown in FIG. 12, the spacer components 62 may take conventional forms that are not configured to provide an air pumping function, such as the cylindrical washer elements shown in this example. Instead, the spacer components 64 may simply provide the function of holding adjacent bodies apart and retaining the magnets within the magnet packages 48.

To provide equivalent cooling effects, the rotor arrangement 42 may therefore include a plurality of impeller vanes 200 that extend along the length of the cylindrical ring structure 46 and project radially inward from an inner circumferential edge of the cylindrical ring structure 46 to define respective leading edges 202 within the central hollow portion.

In which case, the impeller vanes 200 may be arranged in complementary positions to the spacer components 64 so that, as the rotor 32 rotates, the leading edge 202 of each impeller vane 200 meets oncoming air in the central hollow portion, and generates an airflow steered around the respective spacer components 64 and through the respective radial channels 66 extending between the adjacent magnet packages 48. It shall be appreciated that the impeller vanes 200 may extend only partially into the central hollow portion to minimise the cost and weight of the rotor arrangement 42, whilst the leading edges 202 of the impeller vanes 200 may suitably meet the oncoming air, as the rotor arrangement 42 rotates, and guide that air onto surfaces of the impeller vane 200 that accelerate the air in a radial direction.

For this purpose, each impeller vane 200 may take the form of an elongate curved blade, as shown in FIG. 12, that extends from its leading edge 202, within the central hollow portion, to a radially outer respective trailing edge 204 at the inner circumferential edge of the cylindrical ring structure 42. As shown in this example, the impeller vanes 200 may be curved, or even arcuate, between the leading and trailing edges 202, 204 and aligned substantially tangentially with the respective spacer components 64 so as to guide the airflow radially past the spacer components 64 and through the radial channel 66.

The impeller vanes 200 are also arranged so that the longitudinal axis is backwardly inclined with respect to the direction of rotation of the rotor arrangement 42 so that the impeller vanes 200 generate a radially outward airflow. For example, each impeller vane 200 may be arranged so that its longitudinal axis is inclined to the radial direction by an angle of between 30 degrees and 60 degrees. For example, the longitudinal axis of each impeller vane 200 may be inclined to the radial direction by approximately 42 degrees, in a similar manner to the spacer components 64 in the previous example, The skilled person shall appreciate that the impeller vanes 200 may be suitably attached to the cylindrical ring structure 46 using various suitable means, which are not discussed here to avoid obscuring the invention.

It is envisaged that such arrangements will provide substantially equivalent cooling performance to the previous examples.

In other examples, the spacer components 64 may take a form substantially as described previously and the impeller vanes 200 may be arranged in a complementary manner with respect to the spacer components 64, so that collectively, the impeller vanes 200 and the spacer components 64 pump air in a radial direction between the magnet packages 48. It shall be appreciated that, in such examples, the impeller vanes 200 may be aligned with the spacer components 64 so as to direct a suitable airflow onto the air guiding surfaces 72 of the spacer components 64, for further acceleration through the radial channels 66 towards the stator 33. Furthermore, in such examples, the impeller vanes 200 may be attached to the rotor arrangement 42 via connection to the spacer components 64. For example, each impeller vane 200 may be attached to the leading edge 70, or the protruding portion, of a respective spacer component 64.

It is envisaged that such arrangements will provide for further enhancement of the generator cooling.

Furthermore, although not shown in the examples above, a thermal paste may also be applied between the interfacing contact surfaces of the spacer components 64 and the adjacent permanent magnet packages 48 to increase the amount of heat transferred away from the magnets.

The invention claimed is:

1. A rotor arrangement for a wind turbine generator, the rotor arrangement comprising a cylindrical ring structure arranged to rotate around a rotational axis, the cylindrical ring structure comprising:

a plurality of ring-shaped permanent magnet packages arranged coaxially around the rotational axis, a plurality of tie rods extending axially through the plurality of permanent magnet packages to join the plurality of permanent magnet packages together; and one or more spacer components located between at least one axially adjacent pair of the plurality of permanent magnet packages to space the respective pair of permanent magnet packages apart, wherein at least one of the one or more spacer components includes an impeller element that extends radially outward from a leading edge to a trailing edge, the leading edge of the impeller element being configured to meet oncoming air as the rotor rotates and to guide the oncoming air in a radial direction to flow from the leading edge to the trailing edge between the at least one axially adjacent pair of permanent magnet packages, and wherein the impeller element is shaped so that the leading edge protrudes radially inward, beyond an inner circumferential edge of the adjacent permanent magnet package, to meet the oncoming air as the rotor arrangement rotates.

2. The rotor arrangement according to claim 1, further comprising one or more spacer components, located adjacent to an axially outer end package of the plurality of ring-shaped permanent magnet packages, against which one or more retaining elements of the rotor arrangement bear to retain the permanent magnet packages on the plurality of tie rods, the one or more spacer components at the end packages being configured to act as an impeller as the rotor rotates, in use, thereby to cause air to flow in a radial direction across the adjacent end package.

3. The rotor arrangement according to claim 1, wherein each spacer component is arranged for retaining one or more permanent magnets of the adjacent permanent magnet package in one or more respective axial cavities of that permanent magnet package.

4. The rotor arrangement according to claim 1, wherein the at least one of the one or more spacer components is arranged on a respective one of the plurality of tie rods.

5. The rotor arrangement according to claim 4, wherein each of the one or more spacer components includes the impeller element for causing the radial flow of air.

6. The rotor arrangement according to claim 5, wherein each impeller element is elongate and defines a longitudinal axis between the leading and trailing edges.

7. The rotor arrangement according to claim 6, wherein each impeller element is asymmetric.

8. The rotor arrangement according to claim 7, wherein each impeller element comprises:

a first air guiding surface extending between the leading and trailing edges on a first side of the impeller element, facing the oncoming air as the rotor arrangement rotates; and a second air guiding surface extending between the leading and trailing edges on an opposing second side of the impeller element;

wherein the first air guiding surface is, at least partially, concave, and the second air guiding surface is, at least partially, convex.

9. The rotor arrangement according to claim 8, wherein the first air guiding surface is curved in a concave manner in a first portion that extends from the leading edge towards a point of maximum camber and, beyond the point of maximum camber, the first air guiding surface is convexly curved towards the trailing edge.

10. The rotor arrangement according to claim 6, wherein the longitudinal axis of each impeller element is backwardly inclined relative to the direction of rotation of the rotor arrangement, in use, to cause air to flow in a radially outward direction.

11. The rotor arrangement according to claim 10, wherein the longitudinal axis is inclined to the radial direction by more than 30 degrees.

12. The rotor arrangement according to claim 10, wherein the longitudinal axis is inclined to the radial direction by less than 60 degrees.

13. The rotor arrangement according to claim 1, wherein the at least one of the one or more spacer components include a circumferentially extending spacer plate comprising a plurality of radially extending channels recessed from a radial surface of the spacer plate, the plurality of channels being shaped to define a respective one of the one or more impeller elements between each pair of adjacent channels for causing the radial flow of air and directing the radial airflow through the respective pair of adjacent channels.

14. The rotor arrangement according to claim 1, wherein the one or more spacer components are joined by an adhesive to the adjacent permanent magnet package.

15. The rotor arrangement according to claim 1, wherein each of the one or more spacer components includes one or more axial locking formations for engaging one or more complementary formations on the adjacent permanent magnet package to retain the one or more spacer components in position, adjacent to that permanent magnet package.

16. The rotor arrangement according to claim 15, wherein each of the one or more spacer components is arranged for retaining one or more permanent magnets of the adjacent permanent magnet package in one or more respective axial cavities of that permanent magnet package, and wherein at least one of said complementary formations on the adjacent permanent magnet package is defined by one of the one or more axial cavities of that permanent magnet package.

17. The rotor arrangement according to claim 1, further comprising one or more impeller vanes extending radially inward from an inner circumferential edge of the cylindrical ring structure, for causing the radial flow of air as the rotor arrangement rotates.

18. The rotor arrangement according to claim 17, wherein each impeller vane is arranged in a complementary manner to a respective one of the impeller elements of the one or more spacer components so that, collectively, the impeller vane and the impeller element cause the radial flow of air as the rotor arrangement rotates.

19. The rotor arrangement according to claim 18, wherein each impeller vane is connected to a respective one of the impeller elements of the one or more spacer components.

20. The rotor arrangement according to claim 17, wherein each impeller vane extends axially along the length of the cylindrical ring structure.

21. The rotor arrangement according to claim 1, wherein the cylindrical ring structure defines a central hollow portion.

22. The rotor arrangement according to claim 21, further comprising one or more impeller vanes extending radially inward from an inner circumferential edge of the cylindrical ring structure, for causing the radial flow of air as the rotor arrangement rotates, wherein each impeller vane defines a leading edge within the central hollow portion of the cylindrical ring structure, the leading edge being configured to meet oncoming air as the rotor arrangement rotates, and thereby to cause a flow of air in a radial direction.

23. A generator for a wind turbine comprising a rotor arrangement according to claim 1.

24. The generator according to claim 23, comprising a stator arrangement defining a central hollow portion within which the rotor arrangement rotates.

25. A rotor arrangement for a wind turbine generator, the rotor arrangement comprising:

a cylindrical ring structure, defining a central hollow portion, arranged to rotate around a rotational axis, the cylindrical ring structure comprising:

a plurality of ring-shaped permanent magnet packages arranged coaxially around the rotational axis, a plurality of tie rods extending axially through the plurality of permanent magnet packages to join the plurality of permanent magnet packages together; and between at least one axially adjacent pair of the plurality of permanent magnet packages, a plurality of circumferentially arranged spacer components, each of the plurality of spacer components being arranged on a respective one of the plurality of tie rods and being configured to hold that pair of permanent magnet packages apart to define a pair of radial channels that extend between the pair of permanent magnet packages, and a plurality of impeller vanes, each impeller vane extending radially inward from an inner circumferential edge of the cylindrical ring structure to define a leading edge within the central hollow portion of the cylindrical ring structure, the leading edge being configured to meet oncoming air as the rotor arrangement rotates, in use, and thereby to cause a flow of air in a radial direction through the respective pair of radial channels.

26. The rotor arrangement according to claim 25, wherein each impeller vane extends axially along the length of the cylindrical ring structure.

27. A rotor arrangement for a wind turbine generator, the rotor arrangement comprising a cylindrical ring structure arranged to rotate around a rotational axis, the cylindrical ring structure comprising:

a plurality of ring-shaped permanent magnet packages arranged coaxially around the rotational axis, at least one ring-shaped permanent magnet package of the plurality of packages defining an inner circumferential edge, a plurality of tie rods extending axially through the plurality of permanent magnet packages to join the plurality of permanent magnet packages together; and one or more spacer components, located adjacent to an axially outer end package of the plurality of ring-shaped permanent magnet packages, against which one or more retaining elements of the rotor arrangement bear to retain the permanent magnet packages on the plurality of tie rods, wherein at least one of the one or more spacer components includes an impeller element that extends radially outward from a leading edge to a trailing edge, the leading edge of the impeller element protruding radially inward beyond the inner circumferential edge and being configured to meet oncoming air as the rotor rotates and to guide the oncoming air in a radial direction to flow from the leading edge to the trailing edge across the axially outer end package.

28. A rotor arrangement for a wind turbine generator, the rotor arrangement comprising a cylindrical ring structure arranged to rotate around a rotational axis, the cylindrical ring structure comprising:

a plurality of ring-shaped permanent magnet packages arranged coaxially around the rotational axis, at least one pair of adjacent ring-shaped permanent magnet packages being spaced apart from one another, a plurality of tie rods extending axially through the plurality of permanent magnet packages to join the plurality of permanent magnet packages together; and one or more impeller vanes extending radially inward from an inner circumferential edge of the cylindrical ring structure, for causing radial flow of air between the at least one pair of adjacent, spaced apart ring-shaped permanent magnet packages as the rotor arrangement rotates.

29. A rotor arrangement for a wind turbine generator, the rotor arrangement comprising a cylindrical ring structure arranged to rotate around a rotational axis, the cylindrical ring structure comprising:

a plurality of ring-shaped permanent magnet packages arranged coaxially around the rotational axis, a plurality of tie rods extending axially through the plurality of permanent magnet packages to join the plurality of permanent magnet packages together; and one or more spacer components located between at least one axially adjacent pair of the plurality of permanent magnet packages to space the respective pair of permanent magnet packages apart, wherein the one or more spacer components are configured to act as an impeller as the rotor rotates, in use, thereby to cause air to flow in a radial direction, with respect to the rotational axis of the rotor arrangement, between the at least one axially adjacent pair of permanent magnet packages, wherein the one or more spacer components comprise a plurality of circumferentially arranged spacer components, each of the plurality of spacer components being arranged on a respective one of the plurality of tie rods, wherein each of the plurality of circumferentially arranged spacer components is shaped to define an impeller element for causing the radial flow of air, wherein each impeller element is elongate and extends from a leading edge to a radially outer trailing edge, defining a longitudinal axis between the leading and trailing edges, and wherein each impeller element is shaped so that the leading edge protrudes radially inward, beyond an inner circumferential edge of the adjacent permanent magnet package, to meet oncoming air as the rotor arrangement rotates.

30. A rotor arrangement for a wind turbine generator, the rotor arrangement comprising a cylindrical ring structure arranged to rotate around a rotational axis, the cylindrical ring structure comprising:

a plurality of ring-shaped permanent magnet packages arranged coaxially around the rotational axis, a plurality of tie rods extending axially through the plurality of permanent magnet packages to join the plurality of permanent magnet packages together;

one or more spacer components located between at least one axially adjacent pair of the plurality of permanent magnet packages to space the respective pair of permanent magnet packages apart; and one or more impeller vanes extending radially inward from an inner circumferential edge of the cylindrical ring structure, for causing the radial flow of air as the rotor arrangement rotates, wherein at least one of the one or more spacer components includes an impeller element that extends radially outward from a leading edge to a trailing edge, the leading edge of the impeller element being configured to meet oncoming air as the rotor rotates and to guide the oncoming air in a radial direction to flow from the leading edge to the trailing edge between the at least one axially adjacent pair of permanent magnet packages, and wherein each impeller vane is arranged in a complementary manner to a respective one of the impeller elements of the one or more spacer components so that, collectively, the impeller vane and the impeller element cause the radial flow of air as the rotor arrangement rotates.

31. A rotor arrangement for a wind turbine generator, the rotor arrangement comprising a cylindrical ring structure arranged to rotate around a rotational axis, the cylindrical ring structure comprising:

a plurality of ring-shaped permanent magnet packages arranged coaxially around the rotational axis, a plurality of tie rods extending axially through the plurality of permanent magnet packages to join the plurality of permanent magnet packages together;

one or more spacer components located between at least one axially adjacent pair of the plurality of permanent magnet packages to space the respective pair of permanent magnet packages apart; and one or more impeller vanes extending radially inward from an inner circumferential edge of the cylindrical ring structure, for causing the radial flow of air as the rotor arrangement rotates, wherein at least one of the one or more spacer components includes an impeller element that extends radially outward from a leading edge to a trailing edge, the leading edge of the impeller element being configured to meet oncoming air as the rotor rotates and to guide the oncoming air in a radial direction to flow from the leading edge to the trailing edge between the at least one axially adjacent pair of permanent magnet packages, and wherein each impeller vane extends axially along the length of the cylindrical ring structure.

* * * * *